United States Patent Office 3,076,785
Patented Feb. 5, 1963

3,076,785
POLYBENZYL DERIVATIVES AND A PROCESS
FOR THE PRODUCTION THEREOF
Hans-Joachim Kiessling and Helmut Unruh, Rheinberg,
Rhineland, Germany, assignors to Deutsche Solvay-
Werke G.m.b.H., Solingen-Ohligs, Germany
No Drawing. Filed Aug. 30, 1957, Ser. No. 681,164
11 Claims. (Cl. 260—61)

This invention relates to polybenzyl derivatives and to a process for the production thereof.

It is already known (J. Am. Soc., 54, 1932, 1513) that benzyl chloride in the presence of Friedel-Crafts catalysts, such as aluminium chloride, ferric chloride and zinc chloride, condenses to give resinous products called polybenzyl according to the following equation:

$nC_6H_5$—$CH_2Cl$

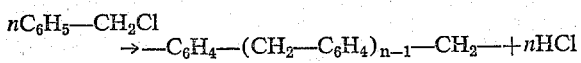

Depending on the catalyst which is used for the condensation, resins more or less insoluble in benzene or soluble in benzene are obtained. If aluminium chloride is used, the resin is insoluble to some extent; with ferric chloride and zinc chloride, resins soluble in benzene are obtained. The condensation, which takes place with splitting off of HCl, can also be carried out in solvents, such as carbon disulphide or hydrocarbons, whereby better control of the reaction is possible, especially with large batches. Towards the end of the reaction the mixture is heated to about 150° C. and the residual hydrochloric acid and the solvent are distilled off in vacuum.

It is further known that in this condensation the molecular weight of the polybenzyl formed can be effectively influenced by the addition of hydrocarbons, such as benzene, toluene, xylene, or naphthalene, so that it is possible to prepare polybenzyls of widely varying molecular weight.

The polybenzyl resins obtained by the known process soften below 100° C.; they are incompatible with drying oils and were previously used only to a very limited extent.

It has been found that valuable products useful for many purposes can be obtained from polybenzyl if the latter is chlorinated and the chlorine of the chlorinated polybenzyl is replaced by other radicals. The exchange of the chlorine may take place, for example, by amination, saponification, etherification, interchange of ester radicals or interchange of ester radicals with splitting off of alkali metal chloride (interchange of acid radicals), if desired with subsequent alcoholysis, interchange of acid radicals, condensation with splitting off of hydrochloric acid, and also by a combination of the reactions indicated above, such as, for example, by saponification followed by interchange of ester radicals.

Although chlorinations of polymers, e.g., of polyvinyl chloride, are known, yet it was not to be expected that the resinous polybenzyls, dissolved in a suitable solvent, could be easily chlorinated. It was also surprising that the chlorinated polybenzyl resins could react with various substances to give soluble workable products. In these reactions the chlorine can be replaced, in many cases completely, by other radicals, for example by reacting chlorinated polybenzyl with ammonia, aromatic amines, aqueous caustic soda solution, aliphatic or aromatic alcoholates, sodium phenolate, alkali metal salts of organic acids, phenol or alkylphenols, aqueous caustic soda solution and then with alkali metal salts of organic acids.

The polybenzyls can be modified extensively by the introduction of different radicals into the molecule. The derivatives thus obtained differ vastly in their properties and can consequently be used for widely differing purposes, such as, for example, as plasticizers, as additions to lacquers, as hardening agents for other resins and also as hardenable resins for the production of plastics.

Thus, hydroxyl containing polybenzyl derivatives can be cross-linked with polyisocyanates and made insoluble; nitrogen-containing polybenzyl derivatives give, with polyepoxy compounds, insoluble, hardened products. The polybenzyl derivatives obtained with phenols with splitting off of hydrochloric acid and still containing free phenolic hydroxyl groups are hardenable with polyepoxy compounds.

The polybenzyl, after the catalyst used in this preparation has been removed, is suitably dissolved in benzene or carbon tetrachloride and chlorinated in known manner at medium temperature, for example, at 70° C. to 80° C. It is also possible, however, to pass chlorine into fluid or molten polybenzyl at 60° C. to 130° C.

In the chlorination, chlorinated polybenzyls with very different contents of chlorine can be produced by suitable selection of the amount of chlorine passed in. When the chlorine is exchanged, it is therefore possible to introduce into variously strongly chlorinated polybenzyls correspondingly variously large quantities of other molecular residues.

Thus, according to the invention, widely different kinds of polybenzyl derivatives can be prepared by starting from polybenzyls of different molecular weights, giving to these during the chlorination different chlorine contents and replacing the chlorine in these chlorinated polybenzyls of different molecular weights and different chlorine contents, more or less completely by other radicals by means of the above-mentioned reactions.

The invention accordingly concerns the chlorination of polybenzyl and the chlorinated polybenzyls obtained by the chlorination, which are to be regarded as valuable intermediate products. The invention further concerns the exchange of the chlorine by other radicals as well as the polybenzyl derivatives obtained through the exchange of the chlorine by other radicals, which derivatives may contain, for example, oxygen, nitrogen or hydroxyl. Finally, the invention concerns also the hardening of, for example, oxygen-containing or nitrogen-containing polybenzyl derivatives, and the hardened products obtained by the hardening.

EXAMPLES

Preparation of Polybenzyl From Benzyl Chloride (1) 1000 g. of benzyl chloride are dissolved in 330 g. of petrol (B.P. 120–180° C.) and 1 g. of ferric chloride is added to the solution. The solution is maintained at 30–40° C. with stirring until the greater part of the hydrochloric acid escaped, and is thereupon heated gradually to 150° C. and the last traces of hydrochloric acid and petrol removed in vacuum (12 mm.). The product obtained contains less than 0.2% of chlorine. To remove the ferric chloride, the resin, solid at room temperature, is dissolved in benzene, so that an approximately 25% solution is formed, and is washed free from iron with half concentrated hydrochloric acid and dried with calcium chloride.

(2) 300 cc. of petrol are heated in a flask with 2 g. of ferric chloride to 100° C. under anhydrous conditions, and 3.26 kg. of benzyl chloride are added with stirring in the course of 3–4 hours. The evolution of the hydrochloric acid is governed by the speed at which the benzyl chloride is added. After the greater part of the hydrochloric acid has been split off, the mixture is heated to 170–175° C. to remove the last traces of hydrochloric acid, and the petrol is removed in vacuum together with any monomers which may be present. For the removal of the ferric chloride, the resin, solid at room temperature, is dissolved in benzene and allowed to run through a 15 cm. thick layer of aluminium oxide.

If it is desired to obtain the polybenzyl in solid form, either the benzene must distilled off or the polybenzyl must be precipitated from the benzene solution with liquid paraffin or with lower alcohols.

If benzyl chloride with a chlorine amount of 27.8 to 28.0% is used and the polycondensation carried out under nitrogen, a polybenzyl of molecular weight 2200 is obtained. If, however, toluene is also added to this benzyl chloride before the condensation, the molecular weight goes down to 1100 with a content of 7.4% of toluene and to 480 with a content of 13.8% toluene.

According to the process as described afterwards, it is possible to obtain polybenzyl with a molecular weight of 300 to 350 which is still liquid at room-temperature. A solution of 300 g. benzylchloride in 300 g. toluene is added to a solution of 0.2 g. ferric chloride in 300 g. toluene at 90°–110° C., with removing the escaping hydrochloric acid by a stream of nitrogen. After the reaction is completed toluene is added to the reaction mixture and the catalyst is removed as described before. After the distilling off of the fractions boiling below 200° C. in vacuum (1 mm. Hg), the residue consists of 177 g. polybenzyl with its softening-point at −12° C., measured after the Durrans method.

*Side-Chain Chlorination of the Polybenzyl*

(3) Into an iron-free solution of polybenzyl in benzene adjusted to a content of 25% to 50% of polybenzyl is passed chlorine at 70° C. to 80° C. with exposure to light, until the desired degree of chlorination is reached. Then the solution is scavenged with nitrogen until free from chlorine.

The chlorination product can be precipitated from the benzene solution with liquid paraffins, such as, for example, petrol ether, or with lower alcohols, such as, for example, methanol, and if desired can be reprecipitated several times for purification. Instead of in benzene the polybenzyl can also be chlorinated in the same way dissolved in carbon tetrachloride.

(4) Chlorine is passed for 1.3/4 hours into a 25% solution of polybenzyl in benzene at 75° C. to 80° C., under illumiation with a 100-watt lamp, and the solution is then scavenged with nitrogen until free from chlorine; from this solution a product is precipitated by methanol or petrol ether, which, after repeated reprecipitation, contains 17.9% of chlorine.

(5) For the partial chlorination of the side chain of the polybenzyl, chlorine is passed for 20 minutes into a 25% solution of polybenzyl in benzene at 75° C. to 80° C. under illumination with a 100-watt lamp, and the solution is then scavenged with nitrogen until free from chlorine. A product is precipitated from this solution by methanol or petrol ether which, after repeated reprecipitation contains 3.99% of chlorine.

(6) Chlorine is passed into 213 g. of molten polybenzyl of molecular weight 480 at 120°–130° C. under exposure to light, until there is an increase in weight of 25 g. The product obtained contains 10.6% total chlorine and 10.5% of saponifiable chlorine.

If a polybenzyl still liquid at room temperature, which has e.g. its softening point at −12° C. is used, the chlorination can be carried out also without exposure to light and without solvent at 60° to 85° C. The product obtained in this way contains e.g. 14% chlorine.

*Amination of the Polybenzyl Chlorinated in the Side Chain*

(7) 70 cc. of a benzene solution containing 25% by weight of chlorinated polybenzyl, the chlorine content of which amounts of 3.99% by weight, are placed in an autoclave with 30 cc. of tetrahydrofuran and 70 cc. of liquid ammonia, and shaken for 8.5 hours at 95° C. After cooling the autoclave and distilling off the ammonia not used, the precipitated ammonium chloride is filtered off and the polybenzyl derivative is precipitated with petrol ether. After repeated reprecipitation the product contains 1.4% of nitrogen and 0.39% of chlorine.

(8) 50 cc. of a toluene solution containing 20% by weight of chlorinated polybenzyl, the chlorine content of which amounts to 8.63% by weight, are placed in an autoclave with 60 cc. of ammonia and shaken for 15 hours at 80° C. to 85° C. After cooling the autoclave and distilling off the ammonia not used, the precipitated ammonium chloride is filtered off and the polybenzyl derivative is precipitated with petrol ether. After repeated reprecipitation the product contains 2.9% of nitrogen and 1.5% of chlorine.

(9) 17 g. of a toluene solution containing 40% by weight of chlorinated polybenzyl, the chlorine content of which amounts to 11.5% by weight, are brought together with 128 cc. of liquid ammonia and shaken for 24 hours at 90° C. to 100° C. After distilling off the ammonia not used, the residue is diluted with toluene, the ammonium chloride is filtered off and the nitrogen-containing product is precipitated from the solution with petrol ether. After repeated reprecipitation the product contains 2.8% of nitrogen and 3% of chlorine.

(10) 25.3 g. of a benzene solution containing 40% by weight of chlorinated polybenzyl, the chlorine content of which amounts to 13% by weight, are boiled under reflux with 10.3 g. of aniline for 16 hours. The reaction product is washed with 2 N NaOH. The product is precipitated from the benzene solution with petrol ether. It is reprecipitated several times to separate the monomeric aniline. A product is thereby obtained with 2.1% of nitrogen and 6.3% of chlorine.

(11) 120 g. of chlorinated polybenzyl containing 7.9% of chlorine (obtained by chlorination at 70° C. under exposure to light of polybenzyl with a molecular weight of 500–600 dissolved in carbon tetrachloride), dissolved in 120 cc. of dioxane are mixed with 120 g. of diethylenetriamine and the mixture heated at 90–100° C. for 15 hours. The dioxan and excess diethylenetriamine are then distilled off, the residue is taken up hot in benzene and the amine hydrochloride is filtered off. From the benzene solution, which is further washed free from chlorine with aqueous 25% caustic potash solution and dried with solid potassium hydroxide, is precipitated with petrol ether an amine with a content of 5.8% of nitrogen and 0.5% of chlorine.

(12) 10 g. of chlorinated polybenzyl containing 24.5% of chlorine, which is obtained in the same manner as indicated in Example 11, are dissolved in 5 g. of dioxan and treated with 10 g. of diethylenetriamine, and the mixture heated at 90° C. to 95° C. for 7 hours while nitrogen is passed through. Dioxand and excess diethylenetriamine are then distilled off, the residue is taken up hot in benzene and the amine hydrochloride is filtered off. From the benzene solution, which is further washed free from chlorine with aqueous 25% caustic potash solution and dried with solid potassium hydroxide, an amine with a content of 13.6% of nitrogen and 1.2% of chlorine is precipitated by cyclohexane.

*Saponification of the Polybenzyl Chlorinated in the Side Chain*

(13) 300 g. of a benzene solution containing 30% by weight of chlorinated polybenzyl, the chlorine content of which amounts to 19.3% by weight, are well mixed by stirring with a solution of 100 g. of sodium hydroxide in 400 cc. of water at 80° C. to 90° C. for 18 hours, with addition of 100 mg. of wetting agent. After distilling off the solvent in vacuum, the solid residue is taken up in benzene and after filtration, precipitated with petrol ether. The product now still contains 14% of chlorine.

*Interchange of Ester Radicals With Splitting Off of Alkali Metal Chloride and Subsequent Alcoholysis*

(14) 5 g. of the product obtained according to Experiment 13 are dissolved in 30 cc. of benzyl alcohol and heated with 4 g. of anhydrous potassium acetate at 120° C. to 140° C. with stirring for 16 hours. The potassium chloride is filtered off hot and the reaction product is precipitated from the filtrate with methanol. After purifying by reprecipitating in benzene-petrol ether, the product still contains 0.4% of chlorine.

(15) 14 g. of chlorinated polybenzyl, the chlorine content of which amounts to 17.9% by weight, are dissolved in 120 cc. of benzyl alcohol. After addition of 19 g. of hydrated potassium acetate, the solution is stirred for 15 hours at 110° C. The potassium chloride is then filtered off in the hot and the polybenzyl containing hydroxyl groups is precipitated from the benzyl alcohol with methanol. The product obtained contains 7% by weight of oxygen and 0.35% of chlorine.

*Interchange of Ester Radicals With Splitting Off of Alkali Metal Chloride (Interchange of Acid Radicals)*

(16) 5.2 g. of soda are dissolved in 33 g. of linoleic acid with stirring. To the clear solution heated to 130° C. are added 28 g. of chlorinated polybenzyl containing 8.6% of chlorine, prepared from polybenzyl of molecular weight 2000, dissolved in 15 cc. of tetralin at 100° C. Two liquid phases are formed which, after a reaction time of 6 hours at 135° C. to 140° C. become one liquid phase. The sodium chloride which is formed separates in finely divided form. After 16 hours, the reaction product is dissolved in benzene and, without filtering, this solution is washed with 4 N aqueous acetic acid solution and dried with sodium sulphate. When methanol is added an oil separates which, after removal of the solvent, remains as a yellow soft resin of the consistency of honey. This resin still contains only 0.7% of chlorine and is readily soluble in benzene and soluble in petrol. All operations carried out at higher temperature are effected in an atmosphere of carbon dioxide with exclusion of oxygen.

(17) 4.5 g. of soda and 30 g. of chlorinated polybenzyl the chlorine content of which amounts to 8.6% by weight, are added to 45 g. of molten stearic acid heated to 130° C. Two phases are formed, which are mixed together with good stirring. After a reaction time of 6 hours, a homogeneous melt is obtained, which is dissolved in benzene. The stearic acid ester is precipitated from the benzene solution with methanol; it still has a content of 0.6% by weight of chlorine and is soluble in linseed oil.

*Saponification of the Polybenzyl Chlorinated in the Side Chain With Subsequent Interchange of Ester Radicals*

(18) 300 g. of a benzene solution containing 30% by weight of chlorinated polybenzyl, the chlorine content of which amounts to 19.3% by weight, are well mixed by stirring with a solution of 100 g. of sodium hydroxide in 400 cc. of water at 80° C. to 90° C. for 18 hours, with addition of 100 mg. of wetting agent. After distilling off the solvent in vacuum, the solid residue is taken up in benzene and, after filtration, precipitated with petrol ether. The product now still contains 14% of chlorine. 5 g. of the chlorine-containing product are dissolved in 30 cc. of benzyl alcohol and heated with 4 g. of anhydrous potassium acetate at 120° C. to 140° C. for 16 hours with stirring. The potassium chloride is filtered off hot and the reaction product is precipitated from the filtrate with methanol. After purifying by reprecipitation in benzene-petrol ether, the product still contains 0.4% of chlorine.

*Etherification*

(19) 30 g. of chlorinated polybenzyl with a chlorine content of 8.63% by weight are dissolved in 45 cc. of dioxan and 9.3 g. of sodium phenolate dissolved in 15 cc. of dioxan are added thereto. The mixture is heated at 100° C. and stirred for 20 hours. After cooling, the sodium chloride which has separated is filtered off and the reaction product is precipitated from the filtrate with methanol. After reprecipitating several times, a product free from monomeric phenolate and still containing 1.1% of chlorine is obtained.

(20) 11 g. of the sodium alcoholate of allyl alcohol are suspended in 150 cc. of dioxan and 25 g. of chlorinated polybenzyl, of which the content of chlorine amounts to 8.6% by weight, dissolved in 40 cc. of dioxan are added thereto at 70°–80° C. with stirring. After a reaction time of 30 hours at 100° C., the substances undissolved in the dioxan are separated at room temperature and the reaction product is precipitated from the solution in dioxan with methanol. It now still contains 0.9% of chlorine.

(21) 30 g. of chlorinated polybenzyl, the chlorine content of which amounts to 8.6% by weight, are dissolved in 80 cc. of benzyl alcohol. To this are added 100 cc. of a benzyl alcohol solution of sodium benzyl alcoholate containing 2.2 g. of sodium per 100 cc. of benzyl alcoholate.

The mixture is heated at 110° C. for 20 hours, the sodium chloride which is formed is filtered off and the product is precipitated with methanol. The precipitated product contains still only 0.1% of chlorine.

*Condensation With Splitting Off of Hydrochloric Acid*

(22) 25 g. of a benzene solution containing 10.2 g. of polybenzyl, the chlorine content of which amounts to 13% by weight, are boiled with 4.5 g. of phenol and catalytic amounts of ferric chloride under reflux for 5 hours while passing in nitrogen. After that, evolution of HCl was scarcely detectable. After the addition of a further 2.5 g. of phenol and some ferric chloride, the mixture is boiled again for 3 hours under reflux, during which only a feeble evolution of HCl was noticeable at the beginning. The solution is filtered from the ferric chloride and the reaction product precipitated with methanol. By dissolving the product in benzene and precipitating with petrol ether, it can be purified from excess monomeric phenol. The product still contains 3% of chlorine.

(23) 50 g. of chlorinated polybenzyl, containing 15.8% by weight of chlorine, are dissolved in 100 cc. of tetralin and treated with 23 g. of phenol dissolved in 20 cc. of tetralin. After addition of 0.5 g. of ferric chloride, the mixture is heated gradually to 90° C. with stirring and passing in nitrogen. After the violent evolution of HCl has abated, the reaction mixture is allowed to stand at 150° C. for a further 15 hours. The mixture is filtered by suction and the product precipitated with petrol. The monomeric phenol can be separated by dissolving in benzene and precipitating with methanol. The preparation so purified still contains 1.1% of chlorine.

(24) 120 g. of a benzene solution containing 61.8% by weight of chlorinated polybenzyl with a chlorine content of 27.4% by weight, are treated with 100 g. of iso-octyl phenol dissolved in 50 cc. of benzene, and heated at 80° C. with stirring and passing in of nitrogen. In this case strong evolution of HCl takes place without Friedel-Crafts catalyst. In 6 hours 8 g. of hydrochloric acid can be split off, corresponding to an approximately 50% conversion. After this, the benzene is distilled off with addition of tetralin and the splitting off of hydrochloric acid is continued at 140° C. to 160° C. with addition of ferric chloride. The tetralin solution is filtered from the ferric chloride and the product is precipitated in the cold with petrol ether. The product obtained shows the following composition: 86.7% carbon, 8.0% hydrogen, 5.6% oxygen and 0.7% chlorine.

*Hardening of Polybenzyl Derivatives*

(25) For the hardening, 50 parts by weight of the polybenzyl derivative containing 7% by weight of oxygen are brought together with 12.5 parts by weight of toluylene diisocyanate in 450 cc. of benzene, and, after evaporation of the benzene, the sample is kept for 10 hours at 130° C. A product insoluble in toluene and remaining hard up to 200° C. is obtained.

(26) 125 parts by weight of the polybenzyl derivative containing 7% by weight of oxygen and 30 parts by weight of toluylene diisocyanate are brought together in 1100 cc. of benzene and allowed to stand at room temperature. After 24 hours a precipitate was observed.

(27) If instead of the toluylene diisocyanate in Experiment 26, the same quantity of hexamethylene diisocyanate is used, gel formation takes place after several days.

(28) For the hardening of the polybenzyl derivative containing 1.4% by weight of nitrogen prepared according to Experiment 7, 100 parts by weight of this derivative and 12.5 parts by weight of toluylene diisocyanate are added to 600 cc. of benzene at room temperature; the solution gels after a few seconds.

(29) 100 parts by weight of the polybenzyl derivative containing 1.4% by weight of nitrogen and prepared according to Experiment 7 are mixed with 12.5 parts by weight of toluylene diisocyanate in 600 cc. of benzene at room temperature, the benzene is evaporated and the resin kept for 10 hours at 130° C. A product is formed which is insoluble in toluene and remains hard up to 200° C.

(30) If the polyphenol prepared according to Example 23 is brought with an epoxide resin (prepared from epichlorhydrin and 4,4′-diphenylolpropane-2,2 molecular weight 380, epoxide equivalent 190–210) into solution in benzene, and some dimethylbenzylamine is added, the benzene is evaporated and the mixture heated at 130° to 135° C. for 12 hours, a product is obtained which is no longer soluble in boiling toluene if the following quantities are employed: 100 parts by weight of polyphenol, 200 parts by weight of epoxide resin, and 5 parts by weight of dimethylbenzylamine; or 100 parts by weight of polyphenol, 100 parts by weight of epoxide resin, and 5 parts by weight dimethylbenzylamine; or 100 parts by weight of polyphenol, 50 parts by weight of epoxide resin and 5 parts by weight of dimethylbenzylamine.

What we claim is:

1. A process of preparing soluble side-chain substituted polybenzyls, comprising dissolving in a solvent selected from the group consisting of aromatic hydrocarbons, aliphatic-aromatic hydrocarbons, benzyl alcohol, and ethers, a soluble side-chain chlorinated polybenzyl prepared by side-chain chlorination of a polybenzyl having a softening point below about 100° C. to about −12° C. and, being obtained by the condensation of benzyl chloride, reacting said dissolved side-chain chlorinated polybenzyl with a compound selected from the group consisting of ammonia, amines, alkali metal hydroxide, alkali metal salts of aliphatic acids, alkali metal alcoholates and alkali metal phenolates, and separating the chloride formed in the reaction from the obtained dissolved side-chain substituted polybenzyl.

2. A method of preparing side-chain amino-substituted polybenzyl derivatives comprising refluxing a side-chain chlorinated polybenzyl prepared by side-chain chlorination of a polybenzyl obtained by the condensation of benzyl chloride and having a softening point below about 100° C. to about −12° C., said side-chain chlorinated polybenzyl being dissolved in an organic solvent selected from the group consisting of aromatic hydrocarbons, aliphatic-aromatic hydrocarbons, benzyl alcohol, and ethers, with an amine selected from the group consisting of alkylamines, arylamines, and aminoalkylamines, and separating the obtained amino-substituted polybenzyl from said amine, amine hydrochloride, and solvent.

3. A method of preparing side-chain amino-substituted polybenzyl derivatives comprising heating a side-chain chlorinated polybenzyl prepared by side-chain chlorination of a polybenzyl obtained by the condensation of benzyl chloride and having a softening point below about 100° C. to about −12°, said side-chain chlorinated polybenzyl being dissolved in an organic solvent selected from the group consisting of aromatic hydrocarbons, aliphatic-aromatic hydrocarbons, benzyl alcohol and ethers, in an autoclave with ammonia at a temperature of about 80 to 100° C., and separating the obtained polybenzyl compound from ammonia, ammonium chloride and solvent.

4. A method of preparing soluble side-chain hydroxyl substituted polybenzyl derivatives comprising heating an alcoholic solution of a side-chain chlorinated polybenzyl with an alkali metal salt of a carboxylic acid at a temperature of about 100–150° C. and separating the obtained polybenzyl derivative from the solvent, the alkali metal chloride, and the ester of the carboxylic acid formed in the reaction.

5. A method of preparing polybenzyl derivatives in which hydrogen of the methylene groups is substituted by aliphatic carboxylic acid radicals, said method comprising heating a solution of a side-chain chlorinated polybenzyl prepared by chlorination of a polybenzyl obtained by the condensation of benzyl chloride and having a softening point below about 100° C. to about −12° C., said chlorinated polybenzyl being dissolved in an organic solvent selected from the group consisting of aromatic hydrocarbons, aliphatic-aromatic hydrocarbons, benzyl alcohol and ethers, at a temperature of about 100–140° C. with an alkali metal salt of an aliphatic carboxylic acid, and separating the obtained polybenzyl derivative from the solvent and the alkali metal chloride formed in the reaction.

6. A method of preparing side-chain hydroxyarylated polybenzyls comprising heating a side-chain chlorinated polybenzyl obtained by the condensation of benzyl chloride and prepared by chlorination of a polybenzyl having a softening point below about 100° to about −12° C., said side-chain chlorinated polybenzyl being dissolved in an organic solvent selected from the group consisting of aromatic hydrocarbons, aliphatic-aromatic hydrocarbons, benzyl alcohol and ethers, which solvent contains ferric chloride as a Friedel-Crafts type catalyst, with a phenol at a temperature of about 80 to 180° C. until the development of hydrogen chloride is substantially terminated.

7. A method of replacing at least part of the chlorine atoms of a side-chain chlorinated polybenzyl by alkylhydroxyaryl groups comprising heating a side-chain chlorinated polybenzyl prepared by side-chain chlorination of a polybenzyl having a softening point below about 100° C. to about −12° C. and dissolved in an organic solvent selected from the group consisting of aromatic hydrocarbons, aliphatic-aromatic hydrocarbons, and ethers, at a temperature of about 80 to 100° C. with an alkylphenol.

8. A method of preparing side-chain hydroxyl-substituted polybenzyl derivatives comprising refluxing a side-chain chlorinated polybenzyl prepared by side-chain chlorination of polybenzyl obtained by the condensation of benzyl chloride and having a softening point below about 100° to about −12° C., said side-chain chlorinated polybenzyl being dissolved in an organic solvent selected from the group consisting of aromatic hydrocarbons, aliphatic-aromatic hydrocarbons, benzyl alcohol and ethers, with an aqueous solution of an alkali metal hydroxide and a wetting agent, and separating the obtained product from the solvent and alkali metal chloride.

9. A side-chain substituted polybenzyl substantially soluble at room temperature in benzene and obtained by reaction of a side-chain chlorinated polybenzyl, which is soluble in aromatic hydrocarbons, with a compound selected from the group consisting of ammonia, alkylamines, arylamines, aminoalkylamines, alkali metal hydroxides, alkali metal salts of aliphatic acids, alkali metal alcoholates, and alkali metal phenolates.

10. A side-chain substituted polybenzyl substantially soluble at room temperature in benzene and obtained by reaction of a side-chain chlorinated polybenzyl, which is soluble in aromatic hydrocarbons, with phenol in the presence of ferric chloride as a Friedel-Crafts catalyst.

11. A hardened polybenzyl composition comprising a hydroxylated polybenzyl cross-linked by organic diisocyanate groups.

References Cited in the file of this patent

UNITED STATES PATENTS

| | | |
|---|---|---|
| 2,445,569 | Fox | July 20, 1948 |
| 2,569,803 | Benneville et al. | Oct. 2, 1951 |
| 2,675,408 | Gump et al. | Apr. 13, 1954 |
| 2,685,573 | Wittbecker et al. | Aug. 3, 1954 |

OTHER REFERENCES

Bezzi: Gazz. Chim. Ital. 66, 491–504.
Schriner et al.: J. Organic Chem. 6, page 315 (1941).
Nakamura: C.A. 49, p. 10661 (1955).
Hauser et al.: Journal American Chemical Society, vol. 78, pages 1653–8 (1956).
Fusco et al.: Ann. Chim. (Rome), vol. 46, pages 122–9 (1956).